Patented Nov. 8, 1932

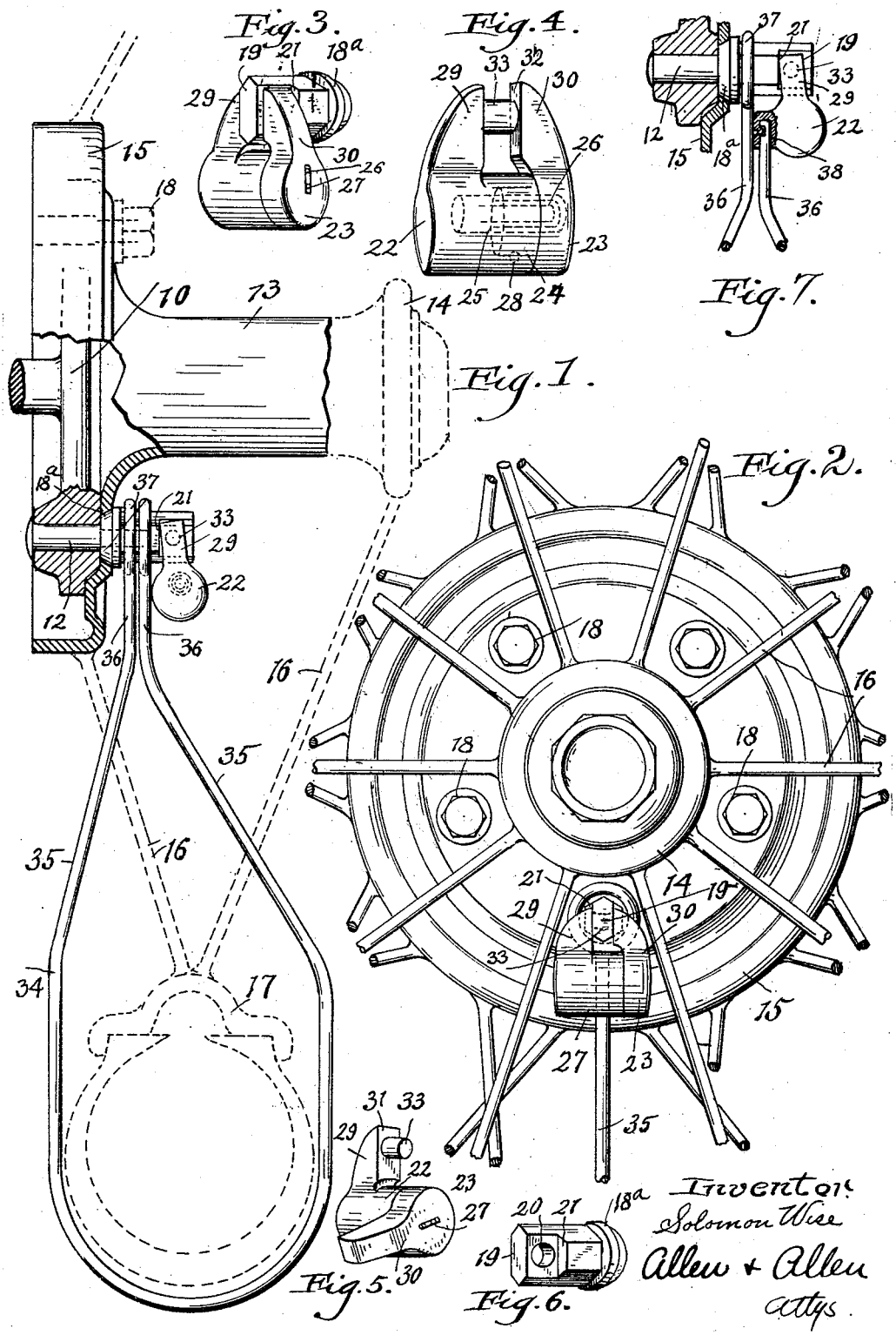
Nov. 8, 1932. S. WISE 1,887,367
SPARE WHEEL AND TIRE LOCK
Filed March 14, 1928

1,887,367

UNITED STATES PATENT OFFICE

SOLOMON WISE, OF CINCINNATI, OHIO

SPARE WHEEL AND TIRE LOCK

Application filed March 14, 1928. Serial No. 261,544.

This invention relates to a spare wheel and tire lock.

An object of the invention is to provide a lock which assures full protection against the theft of either or both the spare wheel of an automobile and the tire carried thereby.

Another object is to provide a spare wheel and tire lock so constructed that the parts thereof will not rattle during operation of the automobile.

Another object is to provide a spare wheel and tire lock which is strong and is easily operated and applied.

Another object is to provide a spare wheel and tire lock which is compact, yet possesses great strength.

Another object is to provide a spare wheel and tire lock which is small and of a pleasing design improving the appearance of the spare wheel rather than detracting therefrom.

Other objects and advantages will become apparent as the description proceeds.

An embodiment of the invention is illustrated in the accompanying drawing wherein:

Figure 1 is a fragmentary end elevation of a spare detachable wheel with the spare wheel and tire lock mounted thereon, portions of the wheel hub and spare tire carrier being broken away and shown in section and the spokes, rim and tire indicated by dotted lines;

Figure 2 is a fragmentary side elevation of a spare wheel mounted upon its carrier with the lock applied thereto;

Figure 3 is a perspective view of the lock applied to the cap nut with which it is adapted to be used;

Figure 4 is a perspective view of the lock per se, the parts being shown in locked position, the tumblers being shown in dotted lines;

Figure 5 is a perspective view of the lock per se, parts being shown in unlocked position;

Figure 6 is a detail view of the cap nut with which the lock is adapted to be used; and Figure 7 is a fragmentary end elevation, partly in section of a modified form.

The spare wheel and tire lock of the present invention is shown as used upon a certain type of demountable wire or steel spoke wheel but, it should be understood, that such showing is for purposes of illustration only and that it is adaptable for use upon other types of wheels. Also, a preferred form of lock per se has been illustrated, and while this form is preferable and novel, it is within the contemplation of the present invention that other forms of locks might be used in combination with the other elements.

In Figure 1 a portion of the wheel is broken away so as to show a spare wheel carrier 10 adapted to be connected to a part of a motor vehicle by a connecting stem or portion 11, or in any other well known manner. This spare wheel carrier is preferably circular in shape, conforming to the part of the wheel to which it is attached, and is provided with a number of outwardly projecting studs 12 suitably fixedly secured at their inner ends and provided with threads upon their outwardly extending ends, as is well known in the art. The number of these studs and the arrangement in which they are spaced about the carrier will vary in accordance with the wheel which is to be mounted thereon and will, of course, be governed by the number of openings in the wheel hub. As the wheel shown herein is of the demountable type, the manner in which it would be mounted upon the active hubs and upon the spare wheel carrier is substantially the same and is well understood in the art. However, a brief description of the wheel and its mode of attachment to the carrier will, perhaps, enable the present invention to be better understood.

The wheel shown comprises a hub 13 formed with an annular bead 14 adjacent its outer end and an annular flanged hub plate 15 at its inner end. It is this last named portion which is adapted to fit over the active hubs of the vehicle and over the spare wheel carrier and to have a number of openings in its face through which project the stud bolts of the hubs or of the carrier which, in the present instance, are five in number. Wire or steel spokes 16, connected to the flanged plate 15 and to the annular bead 14 of the hub, converge outwardly toward the tire carrying rim 17 to which they are connected. When the wheel has been placed upon the carrier so that the studs project through the openings in the plate 15, it is secured in position by cap nuts 18 screwed onto the threaded portions of the studs and provided with enlarged conically tapered portions 18a fitting into the openings and upon which the plate bears. Of course, the same mode of connection is used when the wheel is applied to the active hubs of the vehicle.

The cap nuts 18 are of well-known construction with the exception of the one with which the lock is to be used. This nut has an outwardly extended reduced portion 19, the opposite faces of which are flat and are connected by a transversely extending opening 20 arranged approximately at the middle of the portion 19. Since the portion 19 is reduced in thickness, shoulders 21 are provided on each side of its junction point with the main body of the nut. This special form of nut is preferably applied to the stud which lies below the hub 13 and is in vertical alignment therewith, although, of course, it could be used upon any of the other studs.

The lock which is preferable for use in connection with the special form of cap nut comprises two relatively rotatable parts 22 and 23, the part 22 being substantially cylindrical and the part 23 substantially disc shaped. The part 22 is provided with a circular recess extending from one end substantially to the other, the upper portion of which is enlarged to receive a reduced circular extension 24 from the underside of the part 23, while the lower part of which is reduced to receive a series of nested tubular tumblers 25 of different lengths arranged concentrically to each other. The reduced extension 24 of the part 23 of the lock is also provided with a circular recess for the reception of a similar series of shorter tumblers 26 arranged concentrically to the tumblers in the part 22. Ordinarily, the tumlers 25 in the part 22 extend upwardly past the end of the projection 24 of the other part because of springs arranged in the reduced recess within which they are housed. When it is desired to open or unlock the lock a key is inserted through a key opening 27 in the top of the part 23 and the tumblers 26 are selectively pushed downwardly, in turn pushing the tumblers 25 against the tension of their springs until a line of cleavage is established along the line formed by the inner end of the reduced extension 24, whereupon the two parts may be relatively rotated. It is understood that the two sets of tumblers while arranged concentric to each other are arranged eccentric to the axis of rotation of the parts 22 and 23 and that the part 23 is rotatably keyed by means of a key 28 against axial displacement from the part 22.

The tumbler arrangement of the lock just described employs the principles disclosed in my two prior Patents Nos. 1,390,222 dated September 6, 1921 and 1,597,560 dated August 24, 1926 respectively, and in my copending application Serial No. 129,854, so filed August 17, 1926, accordingly a more detailed description of this tumbler construction is not given in the present application.

Each of the parts 22 and 23 are provided with integral shackle arms 29 and 30 which, when the lock is in locked position, have their inner flat faces 31 and 32 in alignment but spaced apart since the arm 29 is carried adjacent the end of the part 22 furthest removed from the part 23. The face 31 of the shackle arm 29 is provided with a pin 33 projecting perpendicular therefrom and extending across the space between the two faces of the shackle arms when they are in locked position.

When it is desired to apply the lock to the cap nut, which has been previously screwed upon the stud, the pin 33 is passed through the opening 20 in the extension 19 of the nut with the face 31 of the shackle arm 29 in close engagement with one of the flat faces of the extension 19 and since the pin 33 is of a length approximating the thickness of the projection 19 the part 23 of the lock when rotated in the desired direction will have the face 32 of the shackle arm 30 engaging the other flat face of the projection 19 and the free end of the pin 33. The lock is thus securely fastened to the cap nut which cannot now be rotated, since the lock is so proportioned that rotative movement thereof will cause it to strike against a part of the wheel, preferably the hub 13.

The construction thus far relates to the spare wheel locking feature of the invention, while the part now to be described relates primarily to the tire lock feature thereof, although there is a decided co-operation between this feature and the former one in that there is a mutual co-action of the parts to effect certain combined results.

In the form shown, a loop-like member 34 of suitable material is adapted to surround the tire and has converging upwardly extending portions 35 and parallel legs 36 at their upper ends, such last named portions being provided with loops 37 adapted to encircle the cap nut intermediate the shoulder 21 and the enlarged conically tapered portion 18a of the nut. It is obvious that when the loop is applied around the tire and the loops 37 placed over the cap nut and the lock applied thereto, that not only will protection be furnished against theft of the spare wheel but also it will be virtually impossible or at least extremely difficult for any one to remove the tire from the spare wheel. Although the tire lock has been shown and described as comprising a loop the upper ends of which are arranged one behind the other and provided with loops adapted to fit over the stud, it should be understood that other constructions are suitable, as for example, the upper ends might be arranged side by side or otherwise.

As already mentioned, the loop 34 may be constructed of any suitable material but it is contemplated to have the same formed of a material that has a natural spring tendency so that the loops 37 will be constantly forced apart by the bowed portion and the legs 36 adjacent the lock will engage therewith and will swing the same outwardly upon the pin 33 as a pivot, until the shackles 29 and 30 engage tightly against the flanges 21 of the cap nut. It will thus be seen that the parts themselves because of this maintain each other against vibration and rattling during operation of the vehicle and also that the shoulder 21 forms an effective stop against the outward swinging of the lock in an attempt to remove the same from the cap nut.

In actual practice it has been found that a heavy, hardened steel loop is suitable for the part encircling the tire and that such a loop would possess the required inherent resiliency just mentioned. It should also be noted that the loop may be enameled to correspond to the color of the spokes and that, therefore, it will blend into the general appearance of the wheel and not detract therefrom.

The spare wheel and tire lock disclosed in Figure 7 is of a slightly modified form. Instead of providing both of the legs 36 of the loop with the cap nut engaging loops 37 only the one adjacent to the hub plate 15 is so provided, while the leg adjacent to the lock is shorter than the other leg and is attached to the lock. In effecting this attachment of the leg to the lock, the part 22 of the lock is provided with a bore 38 adjacent its rear side and into which the upper end of the outer leg 36 extends. Although the leg 36 is notched and shown in the drawing as extending into the bore and held therein by upsetting the lock into the notch, it should be understood that the leg might merely extend into a recess in the underside of the lock and be welded or otherwise secured therein.

It will be seen that in this modified form the lock and the loop or tire retaining member form a unit. In applying this form of the spare wheel and tire lock, the inner leg of the loop is spread apart from the outer leg and the loop passed around the tire, then the loop 37 at the upper end of the inner leg is passed over the cap nut as in the previously described form, after which the lock is locked in position on the cap nut.

The inherent spring tendency in the loop will force the lock outwardly until the shackle arms engage the shoulder 21 of the cap nut, when the parts will be held against rattling and the lock held against movement outwardly of the wheel.

As already mentioned, the wheel together with the specific construction of the lock members described is purely illustrative as showing a preferred form, but it should be understood that the invention is susceptible of various modifications and adaptations and that it may be applied to various types of wheels provided the same falls within the scope of the following claims:

I claim:

1. A locking device for a spare wheel and tire comprising a lock body in two parts rotatable relative to each other, tongues on each of said parts having plane sides and plane interspaced faces, and a lug on the face of one of said tongues approaching the face of the other tongue, and adapted to be uncovered by a movement thereof, locking means to prevent the relative movement of said parts, a cap nut attached to a car body, and having shoulders against which said plane sides of said tongues may abut, and having a perforated tongue adapted to lie between said interspaced faces and perforated to receive said lug on said lock whereby said lock in locking position may be fastened upon said cap nut at right angles to the axis thereof, said lock being of such size as to strike a projection on said wheel to prevent the complete rotation of said lock, and a U-shaped member adapted to pass around a tire on the rim of said wheel, rings on the legs of said U-shaped member adapted to pass over said cap nut, whereby when said lock is in locking position on said cap nut, said rings may not be removed therefrom.

2. In a locking mechanism for a spare wheel and tire, a cap nut adapted to hold a wheel upon a support, a substantially U-shaped member of spring metal adapted to pass around the rim of said wheel and a tire on said rim, perforated members on the legs of said U-shaped member adapted to pass over said cap nut, and a lock on said cap nut extending at an angle to the axis thereof to prevent removal of said perforated members from said cap nut, and of sufficient length to strike against a portion of the wheel when said cap nut is rotated, said perforated members resiliently engaging said lock.

3. In a locking mechanism for a spare wheel and tire, a cap nut adapted to hold a wheel upon a support, a spring wire adapted to encircle said tire, eyes upon the ends of said wire adapted to fit over said cap nut when said wire is in position, and locking means on said cap nut to prevent removal of the eyes therefrom, said locking means preventing the complete rotation of said cap nut, said eyes resiliently engaging said locking means.

4. A spare wheel and tire lock comprising a spare wheel support on the vehicle, having a threaded projection through an opening in the wheel, a nut screwed on said projection for retaining the wheel on said projection, a member removably locked on said nut, means holding said member, when so locked, radially extended from said nut in such degree as to engage a part of said wheel to prevent unscrewing of the nut, and a loop straddling the tire of the wheel and having eyes embracing said nut, in which said nut is rotatable.

5. A spare wheel tire and lock comprising a spare wheel support on the vehicle, having a threaded projection through an opening in the wheel, a nut screwed on said projection for retaining the wheel on said projection, having an annularly extended flange on its end part next to the wheel, a member removably locked on said nut, means holding said member, when so locked, radially extended from said nut in such degree as to engage a part of said wheel to prevent unscrewing of said nut, and a loop straddling the tire of the wheel and having eyes embracing said nut between said member and said flange, in which eyes said nut is rotatable.

SOLOMON WISE.